(12) United States Patent
Larsen

(10) Patent No.: US 11,185,024 B2
(45) Date of Patent: Nov. 30, 2021

(54) IRRIGATION SYSTEM MAP INTEGRATION

(71) Applicant: Smart Rain Systems, LLC, Centerville, UT (US)

(72) Inventor: Rudy Lars Larsen, Bountiful, UT (US)

(73) Assignee: Smart Rain Systems, LLC, Centerville, UT (US)

( * ) Notice: Subject to any disclaimer, the term of this patent is extended or adjusted under 35 U.S.C. 154(b) by 10 days.

(21) Appl. No.: 16/395,621

(22) Filed: Apr. 26, 2019

(65) Prior Publication Data
US 2020/0337256 A1    Oct. 29, 2020

(51) Int. Cl.
*A01G 25/16*   (2006.01)
*G05D 7/06*    (2006.01)

(52) U.S. Cl.
CPC ......... *A01G 25/165* (2013.01); *A01G 25/167* (2013.01); *G05D 7/0617* (2013.01)

(58) Field of Classification Search
CPC ... A01G 25/165; A01G 25/167; G05D 7/0617
See application file for complete search history.

(56) References Cited

U.S. PATENT DOCUMENTS

| | | | |
|---|---|---|---|
| 5,902,343 A * | 5/1999 | Hale | A01B 79/005 701/50 |
| 6,298,285 B1 | 10/2001 | Addink et al. | |
| 6,453,215 B1 | 9/2002 | Lavoie | |
| 6,782,311 B2 | 8/2004 | Barlow | |
| 6,823,239 B2 | 11/2004 | Sieminski | |
| 7,048,204 B1 | 5/2006 | Addink | |
| 7,203,576 B1 * | 4/2007 | Wilson | A01G 25/165 137/78.3 |
| 8,396,821 B2 | 3/2013 | Kuhns | |
| 8,417,533 B2 | 4/2013 | Clawson | |
| 8,419,533 B2 | 4/2013 | Gazdic et al. | |

(Continued)

FOREIGN PATENT DOCUMENTS

WO    2010099348 A1    9/2010

OTHER PUBLICATIONS

Rainbird Corporation, "Commercial Central Control Systems", Brochure, 2012, 8pgs, D40064A, Tucson, AZ.

(Continued)

*Primary Examiner* — Anil K Bhargava
(74) *Attorney, Agent, or Firm* — Dentons Durham Jones Pinegar; James Larson; Sarah W. Matthews

(57) ABSTRACT

A system and method for irrigation, and managing irrigation of, a property or landscape. The system may include an irrigation management server ("IMS") with the information for an irrigation system. The system may access the irrigation system that has been input into the IMS as well as access a third party map that may display the irrigation system over the map. The system may provide for a user's GPS location to be accessed through and identify the location of the user with respect to the map and irrigation overlay. The system display may provide information regarding the landscape to a user. The system may allow for manipulation of the irrigation system while overlaid on the map by the creation and manipulation of zones within the irrigation system as well as the creation and manipulation of other commands, including watering times and watering duration.

20 Claims, 8 Drawing Sheets

(56) References Cited

U.S. PATENT DOCUMENTS

| | | |
|---|---|---|
| 8,565,927 B1 | 10/2013 | Campbell |
| 8,650,069 B2 | 2/2014 | Mason |
| 8,751,052 B1 | 6/2014 | Campbell |
| 8,862,277 B1 | 10/2014 | Campbell et al. |
| 9,307,706 B2 | 4/2016 | Larsen |
| 10,101,753 B1 | 10/2018 | Levine et al. |
| 10,194,598 B2 | 2/2019 | Bauman et al. |
| 10,660,279 B2 | 5/2020 | Larsen |
| 2003/0093159 A1 | 5/2003 | Sieminski |
| 2004/0030456 A1 | 2/2004 | Barlow et al. |
| 2004/0117154 A1 | 6/2004 | Lane et al. |
| 2004/0117155 A1 | 6/2004 | Lane et al. |
| 2005/0216130 A1 | 9/2005 | Clark |
| 2006/0007008 A1 | 1/2006 | Kates |
| 2006/0015269 A1 | 1/2006 | Rigby et al. |
| 2006/0235739 A1 | 10/2006 | Levis et al. |
| 2006/0248723 A1 | 11/2006 | Gustafson |
| 2006/0254366 A1 | 11/2006 | Williamson et al. |
| 2007/0043536 A1 | 2/2007 | Tonack et al. |
| 2008/0055069 A1 | 3/2008 | Aiki et al. |
| 2009/0099701 A1 | 4/2009 | Li et al. |
| 2009/0216345 A1 | 8/2009 | Chrstfort |
| 2009/0271045 A1 | 10/2009 | Savelle |
| 2009/0281672 A1 | 11/2009 | Pourzia |
| 2010/0042263 A1* | 2/2010 | Jacobsen .............. A01G 25/16 700/284 |
| 2010/0109861 A1 | 5/2010 | Shah |
| 2010/0305764 A1 | 12/2010 | Carr |
| 2011/0040595 A1 | 2/2011 | Chou et al. |
| 2011/0093123 A1 | 4/2011 | Alexanian |
| 2011/0106320 A1* | 5/2011 | Hall .................... A01G 25/165 700/284 |
| 2011/0137827 A1 | 6/2011 | Mason et al. |
| 2011/0166714 A1 | 7/2011 | Stachnik |
| 2011/0178644 A1 | 7/2011 | Picton |
| 2011/0238229 A1 | 9/2011 | Woytowitz |
| 2011/0248846 A1 | 10/2011 | Belov et al. |
| 2011/0264282 A1 | 10/2011 | Blank |
| 2012/0010758 A1 | 1/2012 | Fancino |
| 2012/0036091 A1 | 2/2012 | Cook |
| 2012/0095604 A1 | 4/2012 | Alexanian |
| 2012/0109387 A1 | 5/2012 | Martin |
| 2012/0158192 A1 | 6/2012 | Sherwood |
| 2012/0175425 A1* | 7/2012 | Evers .................. A01G 25/167 239/1 |
| 2012/0239211 A1 | 9/2012 | Walker |
| 2012/0254784 A1* | 10/2012 | Vander Griend ............................ G06Q 10/06315 715/771 |
| 2012/0290140 A1 | 11/2012 | Groenveveld |
| 2013/0060389 A1 | 3/2013 | Marsters et al. |
| 2013/0130820 A1 | 5/2013 | Parks |
| 2014/0005843 A1 | 1/2014 | Thomas |
| 2014/0039696 A1* | 2/2014 | Andrews ............ G05B 19/0426 700/284 |
| 2014/0236868 A1 | 8/2014 | Cook |
| 2015/0032272 A1* | 1/2015 | Neesen ................ G06F 3/0484 700/284 |
| 2015/0070192 A1 | 3/2015 | Kates |
| 2015/0095090 A1 | 4/2015 | Altieri |
| 2015/0100169 A1 | 4/2015 | Mckinney |
| 2015/0105921 A1 | 4/2015 | Shupe |
| 2015/0120009 A1 | 4/2015 | Killian |
| 2015/0319941 A1* | 11/2015 | Klein .................. G05D 7/0629 700/284 |
| 2016/0019560 A1* | 1/2016 | Benkert ............ G06Q 30/0201 700/284 |
| 2016/0057949 A1* | 3/2016 | Williams ................ A01G 22/00 700/284 |
| 2016/0157446 A1* | 6/2016 | Bentwich ............. A01G 25/167 700/284 |
| 2017/0332566 A1 | 11/2017 | Emory et al. |
| 2019/0159411 A1 | 5/2019 | Gungl et al. |
| 2019/0335689 A1* | 11/2019 | Neesen ................ A01G 25/165 |
| 2019/0347836 A1* | 11/2019 | Sangireddy ............ A01C 21/00 |
| 2019/0362444 A1* | 11/2019 | Terrell ............ G06Q 10/06315 |

OTHER PUBLICATIONS

Rainbird Corporation, "ESP-LX Modular Controller Installation, Programming, & Operation Guide", User Manual, 2006, 88 pgs, 636281-010 Rev A, Tucson, AZ.

Rainbird Corporation, "IQ LXM-DTC Satelite Controller Installation & User Guide for the IQ Central Control System", User Manual, 2006, 82pgs, P/N 636544-010 Rev A, Tucson, AZ.

Rainbird Corporation, "IQ v2.0 Central Control Software and Software Feature Packs", Tech Spec, 2010, 2pgs, D40031, Tucson, AZ.

Smart Watering Systems, "Measure. Manage. Monitor Smart Watering Systems RBC Towers—Bentall Property Mississauga, Ontario 2010", Case Study/Flyer, 2010, 1 pg, Mississauga, Ontario, Canada.

Smart Watering Systems, "Measure. Manage. Monitor Smart Watering Systems Wynford Place—Brookfield Residential Toronto, Ontario 2011", Case Study/Flyer, 2011, 1 pg, Toronto, Ontario, Canada.

Smart Watering Sys I Ems, "Measure. Manage. Monitor Smart Watering Systems Yorkdale Mall—Oxford Properties Toronto, Ontario 2009", Case Study/Flyer, 2009, 1 pg, Toronto Ontario, Canada.

Maher, Ali, "Simulation of an Event-Driven Wireless Sensor Network Protocol for Environmental Monitoring," IEEE, 2014, pp. 33-38.

* cited by examiner

IRRIGATION SYSTEM MAP INTEGRATION

TECHNICAL FIELD

This disclosure relates generally to integration of a map with an irrigation system to see a property, and more specifically to integration of a map tool such as Google maps. The features disclosed rely on a system for overlaying an irrigation system over an image of the property with images of the zones, stations, watering units (i.e. sprinklers) and allowing a user to manipulate those zones, stations or watering units by interacting with the overlay on the map.

RELATED ART

Watering and irrigation systems are becoming "smarter" and particularly systems are adapting be readily manipulated and adjustable with smart devices and particularly smart phones. Many irrigation systems are adapting to the increasing demand for smarter tracking of water usage and efficient watering for both environmental reasons as well as economic reasons. Smart watering is becoming more established particularly with large business parks that rely on larger irrigation systems to keep the grounds green and pretty.

These new smart irrigation systems require technology to keep up with demand. The newer systems are implementing flow sensors, evapotranspiration (EV) sensors, and moisture sensors to automatically regulate watering frequency and duration and even regulate which sprinklers, or water units, will turn on and off.

Companies and individuals are becoming increasingly environmentally conscious and are adapting to changes in climate to regulate their water usage. Tracking of water usage for a property continues to be an area of innovation around the world. Adaptive controls can track water usage and maximize the use of every drop of water.

The system described herein allows those adaptive controls to be more readily available and more user-friendly and functional as well. Allowing a user to not only manipulate the system but allow the user to see the system as controls are changed provides more efficiencies and ease of use of these irrigation systems.

SUMMARY

This disclosure, in at least one aspect, relates to the use of a system that is overlaid on a map to give the user a visible display of the property and landscape that is covered by an irrigation system. A system, including a computing device, performs the process of displaying an irrigation system over a map, which may be a Google map. The system utilizes the map to display the irrigation system to provide a user a visible interface with which to manipulate the system.

The system will allow a user to more quickly access the irrigation system and manipulate the system by touching on a specific zone of the irrigation system and choosing a function you with the irrigation system to carry out that function. The functions may be predetermined and be provided through a drop down menu when a user selects the zone that he/she wants to manipulate. The irrigation system will then interact with the system to complete the action chosen by a user.

There is a plurality of methods for overlaying an irrigation system on a map or map structure and multiple variations are disclosed herein. Other aspects, as well as features and advantages of various aspects of the disclosed subject matter will become apparent to one of ordinary skill in the art form the ensuing description, the accompanying drawings and the appended claims.

DETAILED DESCRIPTION

Figure 1:
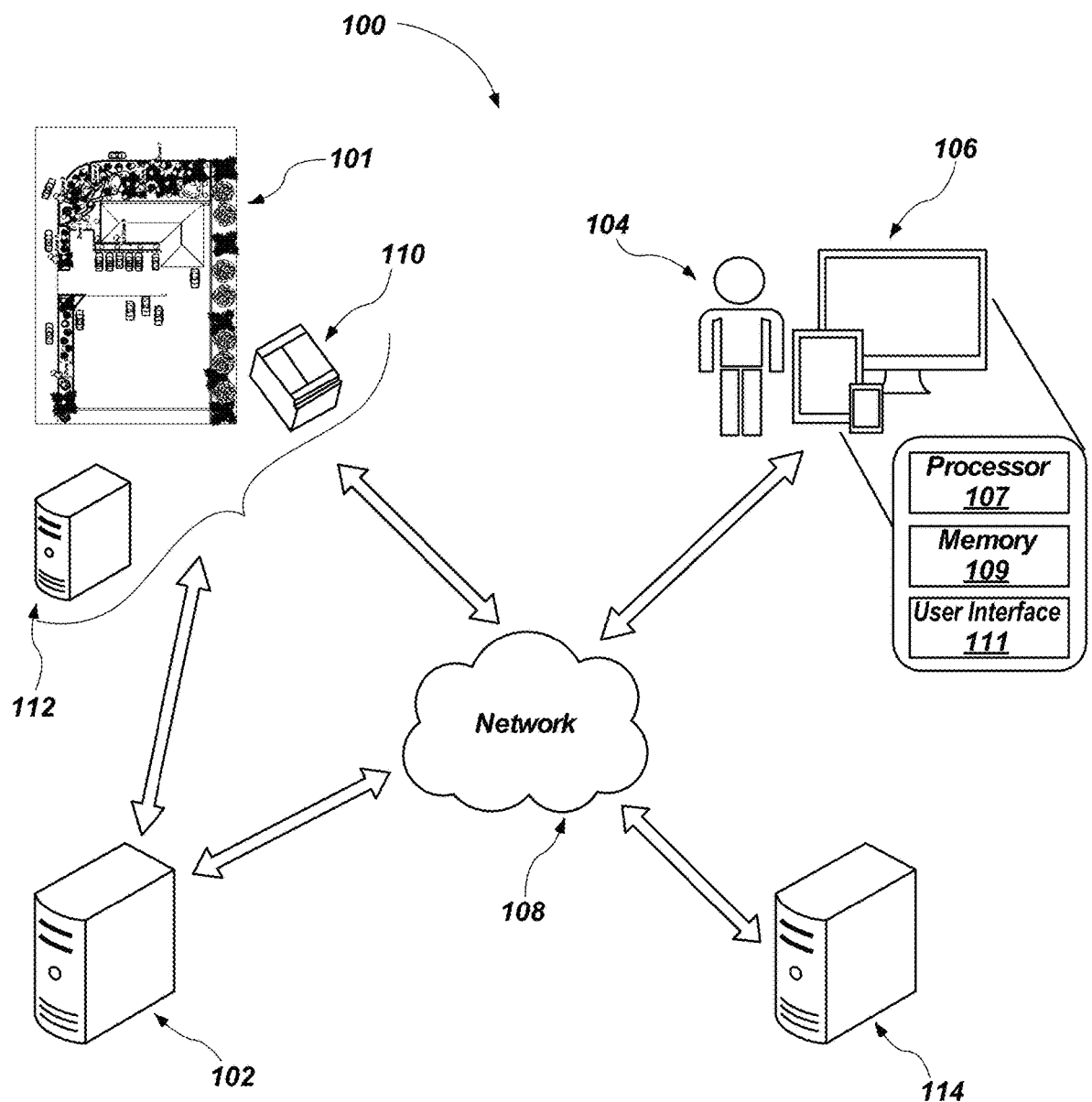
FIG. 1 illustrates an example architecture or schematic for implementation of irrigation preferences. The schematic includes an irrigation system, multiple servers with user access to the irrigation management server (IMS)

A landscape manager or landscape architect, as well as a home owner or business owner, may be responsible for the landscape of a certain property. Management of each irrigation system on a property can prove difficult especially since after irrigation systems are installed the exact location of zones is not often documented sufficiently. It may be desirable for one of these individuals, or users, to be able to access these irrigation systems through mobile application or other computer device that the user owns or physically controls (e.g. mobile phone, tablet, laptop, portable computer, etc.).

It may be desirable for a user to be able to access all the necessary irrigation system information as well as current state of the landscape at any given time and particularly when positioned within the landscape of the property currently managed. A system that not only outlines and provides information about watering zones, but provides the watering zones on an irrigation system overlay on a map of the property to provide a user an easy visual to those zones. Even further the irrigation system may provide irrigation lines and irrigation heads (i.e. sprinkler heads) overlaid on a map to provide a user easy visual access to those watering zones, irrigation lines and heads.

Further still, the irrigation system overlay on a map may allow a user ease in accessing elements of the irrigation system, by zone, by irrigation line or even by individual irrigation head and manipulate the irrigation system through the overlay.

The process and systems described herein may be accomplished or implemented in plurality of ways. The following are examples of those implementations and are provided as referenced to the following figures.

An irrigation system may be installed on a property. The irrigation system may include a plurality of irrigation or water lines as well as irrigation heads or sprinkler heads. Each of the irrigation lines may have at least one valve, or multiple valves within each of the irrigation lines. The sprinkler heads may have single valves incorporated within the sprinkler head itself. The irrigation system may further include a plurality of sensors on or in the lines to determine flow of the water through the lines. The irrigation system may also include moisture sensors. Specific zones may be set up within the irrigation system with each zone providing irrigation, or watering, to a portion of the landscape as commanded by a controller. Zones may be determined during install of the irrigation system and mapped against the property Referring to FIG. 1, a schematic on the interactive environment of the system 100 is depicted for an irrigation system 101. An irrigation management server 102 ("IMS") may be accessed by a user 104 through a user's computing device 106 which may be a mobile device. Each computing device may be equipped with one or more processors 107 and memory 109 with a user interface 111, or user display. The memory 109 may store the applications and data while the processor(s) 107 is able to perform the functions. The IMS 102 may be in communication through one or more networks 108 with the controller 110 for any given irrigation system. The controllers 110 may have their own controller servers 112 that manage the controllers 110 to the system 100. Flow and moisture sensors may be in communication with the controller 110 or directly with the IMS 102. Sensor information may be readily and consistently relayed to the IMS 102.

The user 104 may interact with the IMS 102 and request that actions be performed with the irrigation system 101 by entering specific commands on the user's mobile device 106. The IMS 102 communicates, via the network 108, with the controller servers 112 to perform the actions requested by the user 104.

Additionally, and alternatively, the controller servers 112 may receive input regarding actions for the irrigation system 101 through third party sources or instruments 114 which may be moisture sensors, weather reports, local water utility companies and the like. Information may be relayed to the control servers 112 from these third party sources 114 through the network 108 and cause certain actions to be performed as may be implemented by the system 100 to provide the most efficient irrigation to the property. Furthermore this information from the third party sources 114 may be relayed to the IMS 102 such that the user 104 may utilize this information in interacting with the irrigation system 101.

In addition, a user 104 may directly access the controller servers 112 and bypassing the IMS 102 entirely.

A Global Positioning System ("GPS") is utilized when a user accesses the IMS to provide proper location setting for a user for a given property or irrigation system 101. The GPS may run when a user interacts with the IMS 102 to provide appropriate data of the given irrigation system where the user is located. The GPS may be accessed through the third party servers 114 as well.

Figure 2:
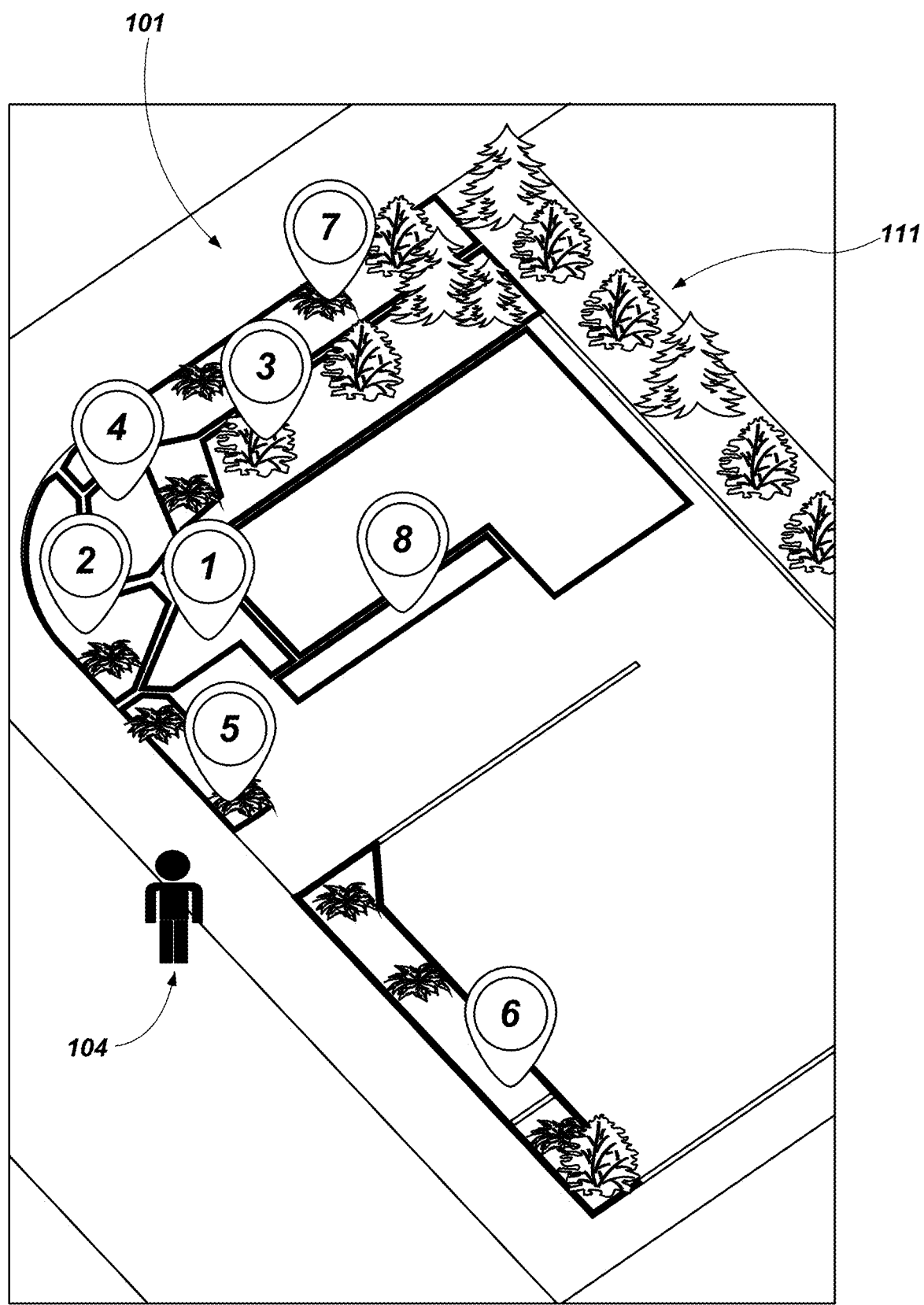
FIG. 2 illustrates an example map irrigation system overlay with a user depicted.

FIG. 2 illustrates an image of a user 104 positioned within the irrigation system 101 as may be depicted from a user display 111, or user interface. A schematic diagram of an illustrative IMS 102 that may be used to provide real-time information of the irrigation system 101 to a user. In some embodiments the IMS 102 may include a display that allows for interaction of a user 104 with the IMS 102. The IMS 102 may include various controls a user 104 can manipulate to control the IMS 102. The user 104 may interact with the IMS 102 via a touch screen display 116 that allows the user 104 to make selections by touching portions of the display to manipulate and interact with the data displayed. The display 116 may provide information regarding the property with each of the watering zones, the current state of the landscaped property including EV rate, moisture content, watering cycles, watering times, etc. The relevant data of the display 116 may be received from a Global GPS that is integrated as part of the mobile device 106. The GPS is accessed when a user 104 accesses the IMS 102 to provide the input of where the user is positioned in relation to a property or irrigation system 101. Absent, any known irrigation system 101 the IMS 102 may provide the closest irrigation system to the mobile device 106 or may request the user enter a specific location through the interactive display 116.

The user 104 may touch the portions of the display 116, or screen, with the information to retrieve additional information that is stored in the memory 109 and that is configured to be accessed when the user 104 touches portions of the display 116 that relate to the information stored in the memory 107. The processor 107 then takes the information from the memory 109 and displays it such that a user may manipulate or interact with the data provided on the display 116. By entering, interacting, or manipulating data from the user with the IMS 102 the IMS hardware is enabled such that the IMS can communicate with remote entities (i.e. the controllers 110) using one or more methods of communication including cellular, Wi-Fi, radio, Bluetooth, optical or the like.

Throughout this disclosure it will be appreciated that the interactions between the display 116 and the system are all processed through the memory 109 and processor 107 of the computing device(s) 106. For ease in describing these interactions are set forth singularly previously herein, although each interaction follows the same pattern and is contemplated and expected herein.

Figure 3:
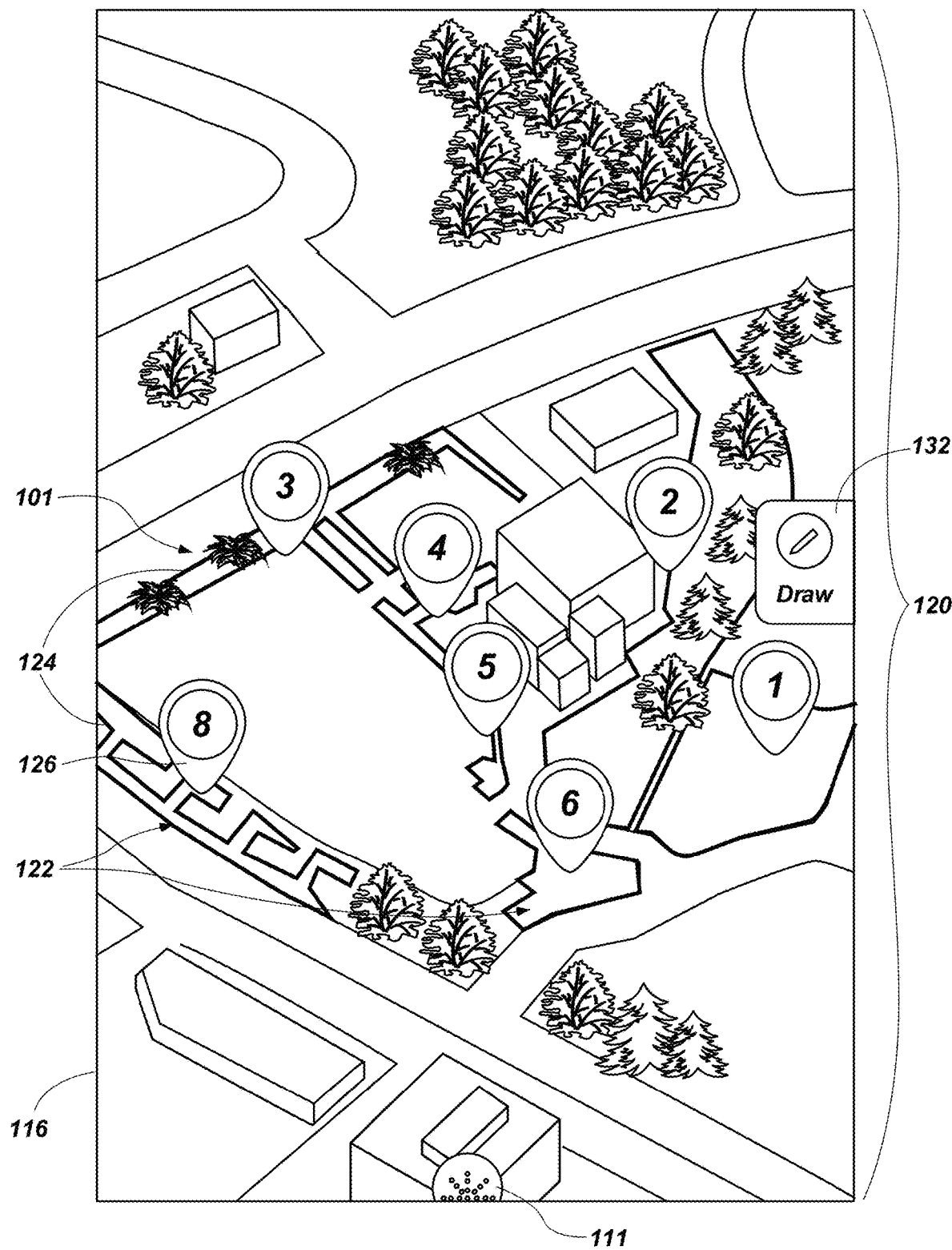
FIG. 3 illustrates an alternate example of an irrigation system overlay on a map which zone perimeter lines.
Figure 4:
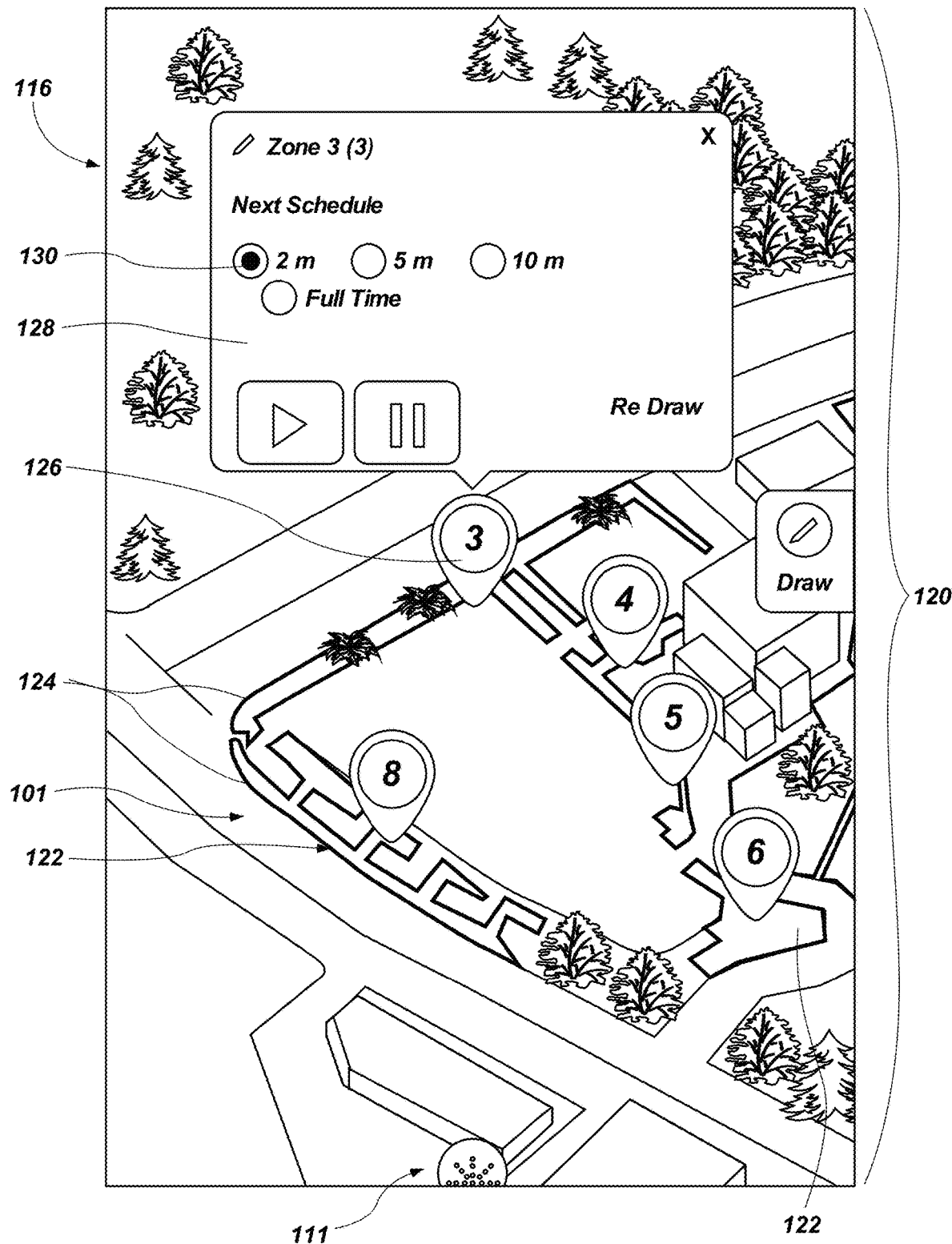
FIG. 4 illustrates the example of FIG. 3 with an example of user tools to manipulate the irrigation system.

FIGS. 3 and 4 illustrate an alternate schematic diagram 118 of an illustrative IMS 102 with the irrigation system 101 overlaid on a map 120, which may be a Google® map. Similar to the previous embodiment, the user 104 may interact with the IMS 102 via a touch screen display 116 that allows the user 104 to make selections by touching portions of the display to manipulate and interact with the data displayed. The display 116 may provide the map 120 with the irrigation system 101 overlay on top of the map 120. The map 120 may be produced by the IMS 102 opening up the GPS automatically. The IMS 102 then interacts, via the network 108 with Google® maps to provide an image of the property that currently maintains the irrigation system 101. The Google® maps may be one of the third party sources 114 that provide information to the IMS 102. The IMS 102 may display the entire irrigation system 101 with each irrigation line and irrigation head lay over the top of the map 120 as well as sensors which may be moisture sensors or flow sensors also installed as part of the irrigation system 101. Alternatively, the IMS 102 may provide watering zones 122, or irrigation zones, and display those zones with a perimeter 124, or perimeter lines, or zone lines, and a zone number 126 of each zone.

The IMS 102 may display a single watering zone 122 that a user 104 is located in and it is identified through the GPS interaction with the IMS 102. The watering zone 122 may be displayed overlaid on the map 120 and specific commands may appear as a secondary menu 128. The IMS 102 may move and recalibrate to display the proper map with the proper irrigation system 101 overlay with the user's 104 movements on the property displaying the proper watering zone 122 wherever the user 104 is positioned.

The user 104 may touch the portions of the display 116 with the information to retrieve additional information or to manipulate or interact with the data provided on the display 116. By touching on a portion of the screen 116 with a watering zone 122 the secondary menu 128 may be provided by the IMS 102. The secondary menu may provide predetermined commands 130 that can be performed for the watering zone 126. Additional commands may be input by the user 104 into the IMS from the same secondary menu 128. The user 104 may touch on a portion of the display 116 that provides a command to the IMS 102 that may then relay that information from the IMDS 102 through the network 108 to the controller server 112. The command may further be relayed to the controller 110 which may perform the action initiated from the IMS 102. At any stage a user 104 may access the "draw" function of the system 132 on the display screen 116 allowing for manipulations of the zones 122 by changing the perimeter lines 124 as will be further described herein.

By entering, interacting, or manipulating data from the user with the IMS 102 the IMS hardware is enabled such that the IMS can communicate with remote entities (i.e. the controllers 110) using one or more methods of communication including cellular, Wi-Fi, radio, Bluetooth, optical or the like.

Figure 5:
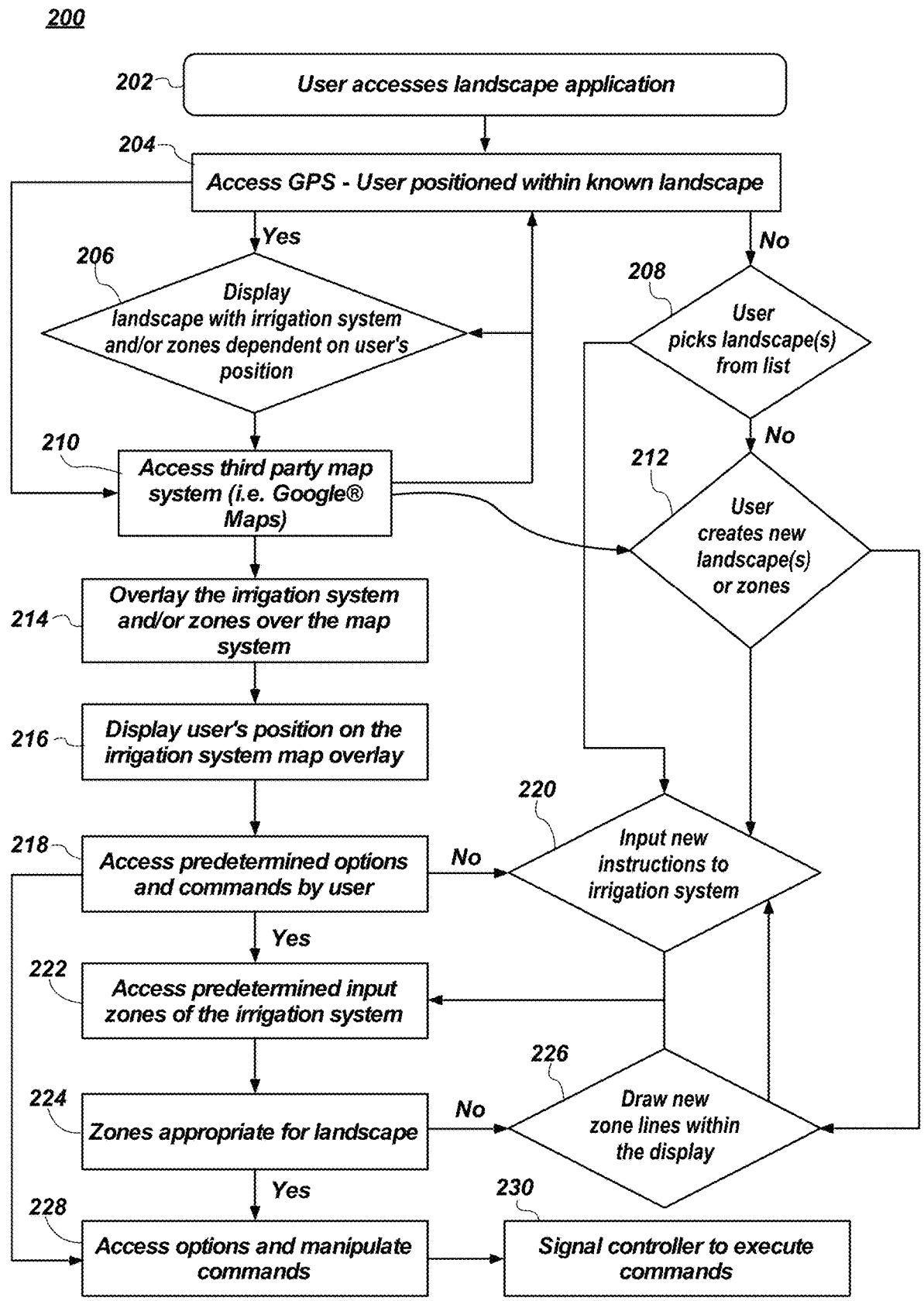
FIG. 5 is a flow diagram of an illustrative process for providing irrigation system access and manipulation, including predetermined commands and accessibility to enter new commands.

FIG. 5 illustrates a flow diagram of an illustrative process 200 of providing information to a user of an irrigation system on a property. The process 200 is organized to depict a user's interaction with the IMS that is most likely to participate in the described operation. The blocks within the diagram depict operations to be performed by the hardware utilizing the software within the device. The blocks may represent computer-executable instructions that, when executed, perform the operations set forth in the blocks. The order set forth in the diagram are not intended to limit the scope of the process 200 but may be combined, reversed, run in tandem or parallel to provide for greatest efficiency.

The process 200 is described within the infrastructure of FIG. 1 of the system 100. The process also depicts the user's interaction with the software application to perform commands as set forth in the application. The process may be used and access by an owner, landscape manager, property manager or the like.

The process 200 may begin be receiving an input from a user which may be the opening of a software application on a smartphone (202). The process 200 may include accessing the GPS function of the smartphone or enabling a GPS function within the application (204). The system 100 may display the irrigation system and/or landscape where the user 104 is positioned is positioned in accordance with the GPS coordinates (206). Alternatively, if the user 104 is accessing a landscape or irrigation system and the user is not in any known GPS coordinates with an irrigation system the system 100 may present the user 104 with options of which system to choose (208) or it may default to the closest irrigation system with GPS coordinates closest to the user's position.

The process 200 may display a map 120 accessed through the internet (210) which may be a Google® map showing a depiction of a property with the irrigation system 101. The irrigation system 101 may overlay on the map 120 (214). In the instance where an irrigation system has not been set up in the system 100, the process 200 may allow a user 104 to input the irrigation system 101 into the property or landscape (212).

Alternatively, after the GPS location of the user 104 is identified, the user 104 may create an access to a new landscape or irrigation system by displaying the map 120 and allowing a user to create the new irrigation system overlaid on top of map (220) and (226). It will be appreciated that the variety and ability of the process 200 to access any option is contemplated and anticipated.

The user 104 may be displayed on the irrigation system map overlay (216) and as may be depicted in FIG. 2. The GPS location and map overlay may continually update, which may show on the display 116, as a user moves around the property or landscape. The irrigation system map overlay may depict the zones 122 with the perimeter lines 124, or zone lines, so a user 104 can determine which zone 122 the user is located in. The user 104 may access commands which may be preset or predetermined commands (218) that allow a user 104 to manipulate the system 100. Accessing known commands may include watering times, watering duration, turning on the system 101 or turning off the system 101. The process 200 may also provide options of information to the user (218). Options provided can be information from third parties such as weather services, local water and utility information, EV data, moisture content data and the like from sensors which may reside in the zones 122. The information and commands may be structured by specific zones (222) and allow a user to access data contingent on the zone 122 the user resides in or the zone 122 the user selects.

Additionally, a user 104 may opt to provide new instructions to the system 100 and the process 200 may allow for a user to input new commands (220) or gather new information from separate sources (i.e. internet) to more efficiently handle irrigation and watering for the irrigation system 101. The new commands (220) may be stored in the memory 109 and be executed by the processor 107, by the user inputting sufficient information into the system 100, to allow such function to be executed. One potential change may be the redrawing of zones 122, or redrawing of the perimeter lines 124, to manipulate irrigation lines and/or irrigation heads (226) by changing watering times, watering duration, and which sprinkler heads come on with which zone 122. This redrawing of perimeter lines 124 allows the irrigation system 101 to manipulate where and when water is being provided to a given landscape. A user can manipulate those perimeter lines 124 while in any given zone 122 and as the user is wandering the landscape.

The zones 122 may be appropriately drawn (224) and thus no manipulation may be required. The user may touch on the display map 120 within the perimeter lines 124 in any given zone 122 to access further commands and information in those zones 122 as set forth previously herein (228). Furthermore the user is able to manipulate the commands, add new commands, gather further information or remove unimportant information (228). The commands that are chosen, entered or manipulated are then sent as an output to the appropriate server(s) 102 (or 112) through the network 108. The server(s) 102, 112 then relay or provide those commands to the controller 110 to execute the command with the irrigation system 101.

After commands or options are chosen the processor 107 will send a signal to the controller 110 to execute those commands (230). Commands may be relayed as depicted through FIG. 1 through a series of servers or through the original IMS 102 to the controller 110.

Figure 6:
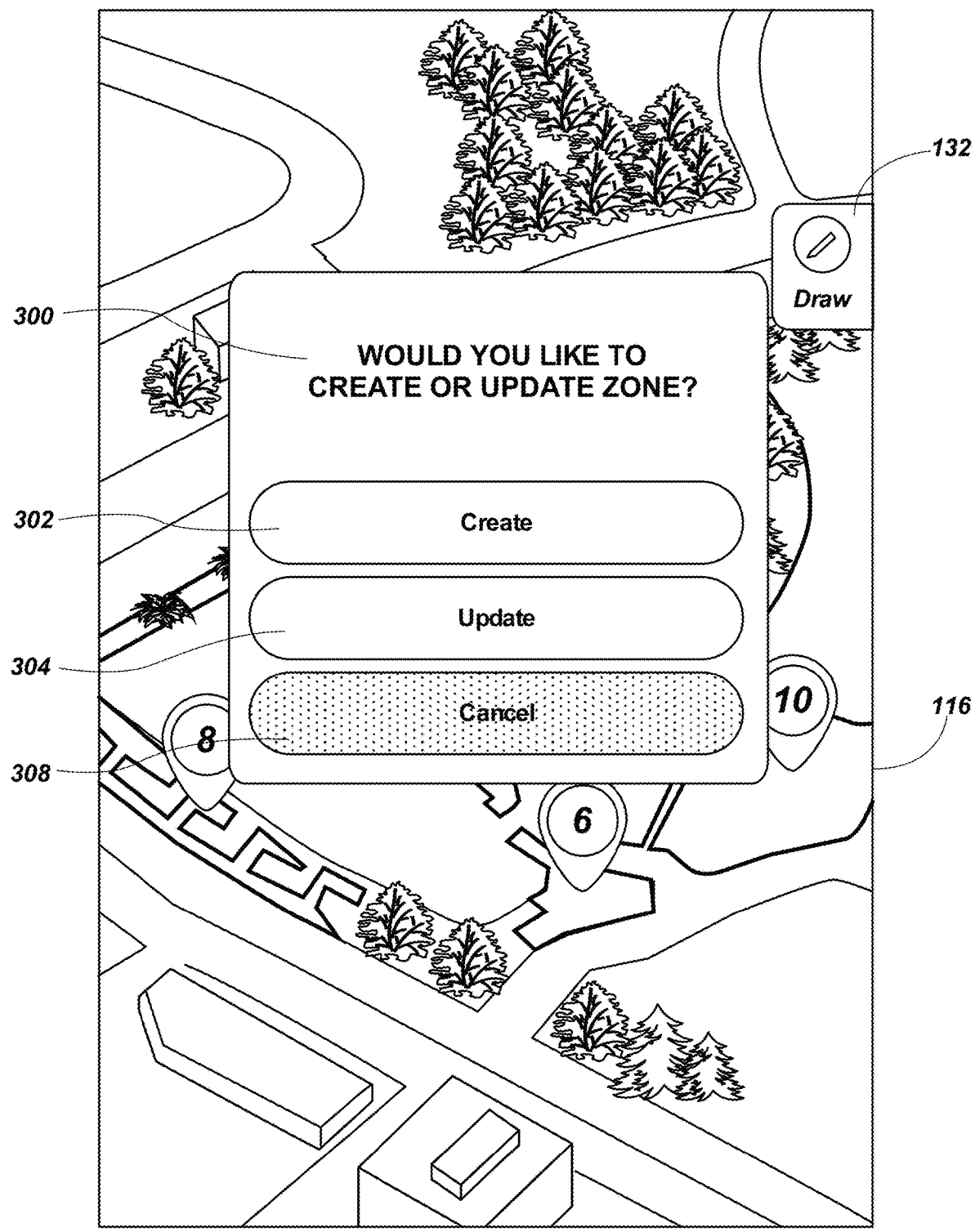
FIG. 6 illustrates an example architecture of user tools on a display for editing a zone of the irrigation system.
Figure 7:
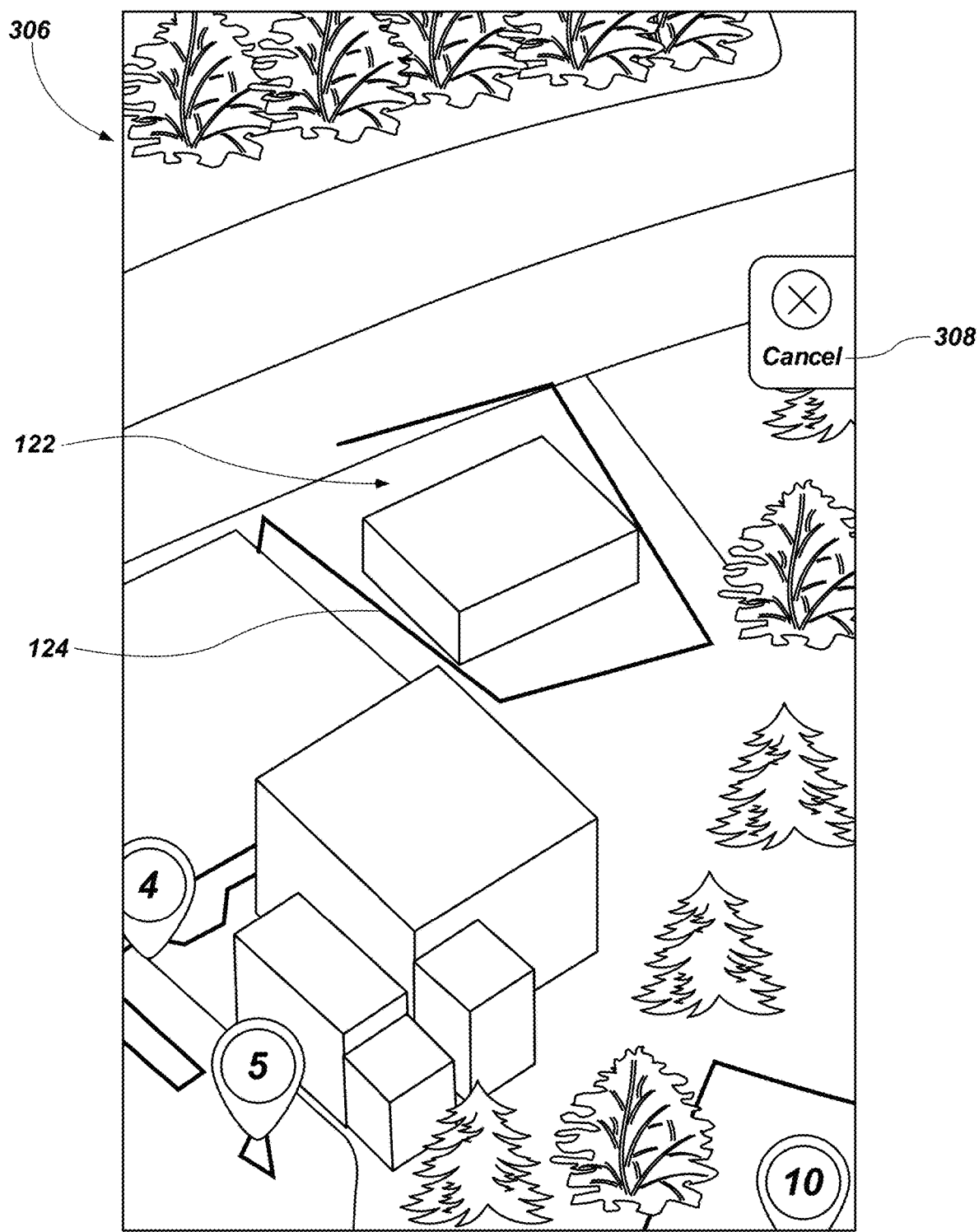
FIG. 7 illustrates the example of FIG. 6 with an example of user tools to manipulate perimeter lines of the zone.

Regarding FIGS. 6-7, part of a separate secondary menu 300 may be produced by the system 100 and then accessed by the user 104 upon the GPS location being provided to the device 106 or by the user 104 inputting the landscape information to the device 106 thus providing the user the ability to create or update zones 122 (212) (226) within the system 100. If the system 100 is unable to identify current zones the secondary menu 300 may appear automatically. Alternately, the user may interact with the display 116 and navigate to the secondary menu 300 that allows for creation or manipulation of the zones 122.

The user 104 may perform the function of updating (editing) or creating zones 122 by interaction with the display 116 and navigating to the user's choice of either creating 302 or updating 304 the zones 122, which will lead to a successive display 306. The successive display 306 allows a user to draw using the draw function 132 to create perimeter lines 124 which in turn create the appropriate zones 122. At any time the user can save the new zones 122 or cancel the drawing by navigating to the cancel function 308. Drawing the zones 122 with perimeter lines 124 may be done by a user's 104 finger on the display 116, which may be a touch screen display; or alternatively, may be manipulated with a separate computer mouse, touch pad, stylus or the like and is well known and accepted in the art for computing devices.

Figure 8:
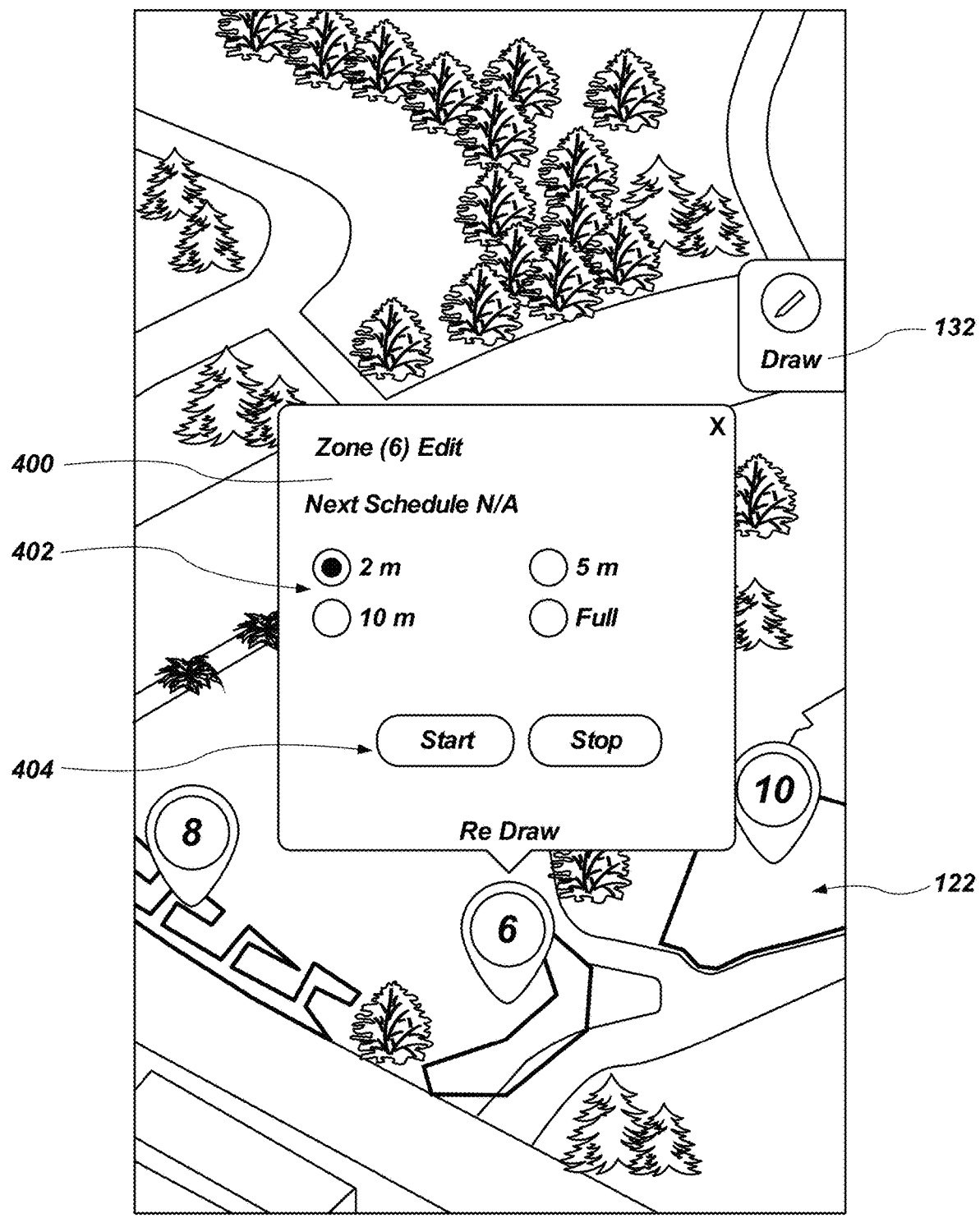
FIG. 8 illustrates the example of FIG. 6 with an example of user tools to manipulate watering times of the zone.

Regarding FIG. 8, upon completion of zone manipulation a tertiary menu 400 may be provided to a user that may provide predetermined functions for the user to choose from or provide an option for the user to input new functions. The tertiary menu 400 may include schedules of watering 402 that may be similar to other zones 122. Alternately the tertiary menu 400 may allow a user to initiate or cease watering or irrigation activities 404. Further, a user may input different functions as set forth in FIG. 5. For example a user may input instructions to the irrigation system (220) that are not predetermined. The tertiary menu 400 may also allow for access 408 to the secondary menu 300 for the manipulation of the zones 122 as often as desired by the user 104.

The irrigation system 101 may include a plethora of valves, irrigation or sprinkler heads, irrigation lines, flow sensor and moisture sensors (the irrigation system "element(s)") to allow for ease in manipulation of the zones 122. While the Figures and examples set forth herein relate to zones 122 particularly it will be appreciated that the same system 100 may display the irrigation system 101 with each of its valves, sprinkler heads, water lines and sensors. The system 100 may display each of these sprinkler heads, irrigation lines, sensors and the like upon selection of a zone 122 from the display 111. A user 104 may be able to navigate to each of these elements respectively and retrieve information from each element, where each element may be in communication with the IMS 102 so that such information is readily accessible to the user 104. Particularly, if a user's GPS location is within a known zone 122 the display may be such that the information is readily displayed on the display 116 without the user requiring navigation to the specific zone 122 and additionally without navigation to a specific line, head or sensor.

Additionally, valves may be installed and positioned within the irrigation system 101 to allow for easy manipulation and redrawing of perimeter lines 124 of the zones 122. The additional valves may be controlled by the controller 110 after information is provided to the controller regarding the zones 122. Valves may be installed in locations separate from a valve box to make zone 122 manipulations easier. The system 100 may only allow for drawing of zones 122 using the draw function 308 dependent upon the valve placement within the irrigation system 101. The system 100 may prevent a user 104 from drawing or editing (212) (226) a zone 122 if the irrigation system 101 can handle such a change because the irrigation system 101 will have the appropriate irrigation elements to allow such manipulation as set forth in the schematic of FIG. 5 (228).

Although the foregoing disclosure provides many examples, such as use of the system for commercial landscapes, it will be appreciated that residential landscapes, agricultural landscapes and virtually any other landscape is considered and contemplated and these should not be construed as limiting the scope of any of the ensuing claims. Other embodiments and configurations may be devised which do not depart from the scopes of the claims. Features from different embodiments and configurations may be employed separately or in combination. Accordingly, all additions, deletions and modifications to the disclosed subject matter that fall within the scopes of the claims are to be embraced thereby. The scope of each claim is indicated and limited only by its plain language and the full scope of available legal equivalents to its elements.

What is claimed:

1. A system for irrigation management comprising:
    an irrigation system information input into a computing device;
    an irrigation system comprising flow sensors, moisture sensors, and a plurality of valves positioned in a plurality of locations within the irrigation system;
    an irrigation management server ("IMS") with a processor and an IMS memory, the irrigation management server configured to:
        receive the irrigation system information input by a user, the irrigation system information comprising a location of the flow sensors within the irrigation system, and a location of the moisture sensors within the irrigation system;
        retain the irrigation system information in the IMS memory;
        retrieve GPS location of a user seeking access to the irrigation system;
        retrieve a third party map of the GPS location of the irrigation system;
        access the irrigation system;
        overlay the irrigation system information onto the third party map;
        and
        display the location of the flow sensors within the irrigation system, and the location of the moisture sensors within the irrigation system over the third party map on a computing device;
        display the irrigation system information over the third party map on a computing device, the display of the irrigation system information comprising at least one perimeter line of at least one zone, and further comprising at least one interactive secondary menu displayable over the third party map on the at least one zone, the at least one interactive secondary menu comprising selectable, predetermined commands relating to the at least one zone, the selectable, predetermined commands comprising at least one selected from the group of: soil evaporation rate of the at least one zone, moisture content of the at least one zone, and watering times of the at least one zone.

2. The system of claim 1, wherein the display of the irrigation system information displays at least one perimeter line of at least one zone.

3. The system of claim 2 further configured to:
    allow a user to manipulate the at least one perimeter line of the at least one zone utilizing the display of the computing device.

4. The system of claim 2, wherein the irrigation system comprises sensors and the irrigation management server of claim 1 is further configured to:
retrieve sensor information from the irrigation system;
allow a user to display sensor information on a computing device by selecting the at least one zone.

5. The system of claim 1, wherein the display of the irrigation system information displays at least two zones and at least two zone numbers on the display.

6. The system of claim 5 further configured to:
allow a user to manipulate a perimeter line of the at least two zones utilizing the display of the computing device.

7. The system of claim 1 comprising:
irrigation lines;
irrigation heads;
a plurality of valves positioned in a plurality of locations within the irrigation system; and wherein the irrigation management server is configured to:
receive the irrigation system information input by a user, the irrigation system information comprising a location of the irrigation lines within the irrigation system, a location of the irrigation heads within the irrigation system;
retain the irrigation system information in the IMS memory; and display the location of the irrigation lines within the irrigation system and, the location of the irrigation heads within the irrigation system over the third party map on a computing device.

8. The system of claim 7; wherein the plurality of valves, irrigation heads, flow sensors and moisture sensors are in communication with the irrigation management server.

9. The system of claim 1 further configured to:
retrieve weather information from third party servers;
retrieve local water utility information from third party servers; and
upon a user's selection of at least one zone, displaying the weather information and the local water utility information at a location of the at least one zone on the computing device display.

10. The system of claim 1, wherein the IMS is further configured to overlay the GPS location of the user seeking access to the irrigation system onto the third party map.

11. A method for displaying and manipulating an irrigation system, the method comprising:
inputting the irrigation system into an irrigation management server;
accessing the irrigation system;
retrieving a GPS location of a user seeking access to the irrigation system;
retrieving a third party map of the GPS location of the irrigation system;
overlaying the irrigation system onto the third party map;
displaying the irrigation system over the third party map on a computing device display, including a location of at least one flow sensor within the irrigation system, and displaying a location of at least one moisture sensors within the irrigation system over the third party map on the computing device; and
displaying a perimeter line of a first zone and a perimeter line of a second zone, and upon a user's selection of the first zone displaying an interactive first zone secondary menu at a location of the first zone on the computing device display, the interactive first zone secondary menu comprising predetermined, selectable functions relating to the first zone; the predetermined, selectable functions relating to the first zone comprising at least one selected from the group of: soil evaporation rate of the first zone, moisture content of the first zone, and scheduled watering times of the first zone; and upon a user's selection of the second zone displaying an interactive second zone secondary menu at a location of the second zone on the computing device display, the interactive second zone secondary menu comprising predetermined, selectable functions relating to the second zone, the predetermined, selectable functions relating to the second zone comprising at least one selected from the group of: soil evaporation rate of the second zone, moisture content of the second zone, and scheduled watering times of the second zone.

12. The method of claim 11, wherein the displaying of the irrigation system over the third party map comprises:
displaying at least one perimeter line of at least one zone.

13. The method of claim 12, comprising:
allowing a user to manipulate the perimeter lines of the at least one zone utilizing the display of the computing device.

14. The method of claim 12, wherein the irrigation system comprises sensors, the method further comprising:
retrieving sensor information from the irrigation system;
allowing a user to display sensor information on a computing device by selecting the at least one zone.

15. The method of claim 11, wherein the display of the irrigation system further displaying zones and zone numbers on the display.

16. The method of claim 15, further comprising:
allowing a user to manipulate the zones and zone numbers utilizing the display of the computing device.

17. The method of claim 11, wherein the irrigation system comprises:
irrigation lines;
irrigation heads;
a plurality of valves positioned in a plurality of locations within the irrigation system; and
wherein the method comprises displaying, over the third party map on a computing device, a location of the irrigation lines within the irrigation system and a location of the irrigation heads within the irrigation system.

18. The method of claim 17; wherein the plurality of valves, irrigation heads, flow sensors and moisture sensors are in communication with the irrigation management server.

19. The method of claim 11, further comprising:
retrieving weather information from third party servers;
retrieving local water utility information from third party servers; and
upon a user's selection of the first zone, displaying the local water utility information and the weather information at a location of the first zone on the computing device display.

20. A system for managing an irrigation system comprising:
the irrigation system comprising at least one flow sensor, at least one moisture sensor, and a plurality of valves positioned in a plurality of locations within the irrigation system;
an irrigation system information input into a computing device;
an irrigation management server ("IMS") with a processor and an IMS memory, the irrigation management server configured to:
receive the irrigation system information input by a user, the irrigation system information comprising a location of the at least one flow sensor within the irrigation system, and a location of the at least one moisture sensor within the irrigation system;
retain the irrigation system information in the IMS memory;
retrieve GPS location of a user seeking access to the irrigation system;
retrieve a third party map of the GPS location of the irrigation system;
access the irrigation system;
overlay the irrigation system information onto the third party map; and
display the location of the at least one flow sensor within the irrigation system, and the location of the at least one moisture sensor within the irrigation system over the third party map on a computing device;
display the irrigation system information over the third party map on a computing device, the display of the irrigation system information comprising at least one perimeter line of at least one zone, and further comprising at least one interactive secondary menu displayable over the third party map on the at least one zone, the at least one interactive secondary menu comprising selectable, predetermined commands relating to the at least one zone, the selectable, predetermined commands comprising at least one selected from the group of: soil evaporation rate of the at least one zone, moisture content of the at least one zone, and watering times of the at least one zone.

* * * * *